US011906003B2

(12) United States Patent
Ogawa et al.

(10) Patent No.: US 11,906,003 B2
(45) Date of Patent: Feb. 20, 2024

(54) COUPLING DEVICE AND ROTATIONAL PHASE ADJUSTMENT METHOD FOR COUPLING DEVICE

(71) Applicant: MITSUBISHI HEAVY INDUSTRIES ENGINE & TURBOCHARGER, LTD., Sagamihara (JP)

(72) Inventors: Hisao Ogawa, Sagamihara (JP); Satoshi Kinoshita, Kawasaki (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 133 days.

(21) Appl. No.: 17/606,980

(22) PCT Filed: May 29, 2020

(86) PCT No.: PCT/JP2020/021334
§ 371 (c)(1),
(2) Date: Oct. 27, 2021

(87) PCT Pub. No.: WO2020/241824
PCT Pub. Date: Dec. 3, 2020

(65) Prior Publication Data
US 2022/0213933 A1 Jul. 7, 2022

(30) Foreign Application Priority Data
May 29, 2019 (JP) .................. 2019-099997

(51) Int. Cl.
*F16D 3/79* (2006.01)
*F16D 1/08* (2006.01)
*F16D 1/092* (2006.01)

(52) U.S. Cl.
CPC ............. *F16D 3/79* (2013.01); *F16D 1/0864* (2013.01); *F16D 1/092* (2013.01)

(58) Field of Classification Search
CPC ........ F16D 1/076; F16D 1/0864; F16D 1/092; F16D 1/12; F16D 3/78; F16D 3/79
(Continued)

(56) References Cited

U.S. PATENT DOCUMENTS 1,195,250 A * 8/1916 Milbrath .................. F16D 3/78
464/93
1,651,671 A * 12/1927 Carrey ...................... F16D 3/78
464/93
(Continued)

FOREIGN PATENT DOCUMENTS

CH 351805 A * 1/1961 ............... F16D 3/78
DE 1 284 710 B 12/1968
(Continued)

OTHER PUBLICATIONS

Extended European Search Report for European Application No. 20814282.8, dated May 4, 2022.
(Continued)

*Primary Examiner* — Josh Skroupa
(74) *Attorney, Agent, or Firm* — Birch, Stewart, Kolasch & Birch, LLP

(57) ABSTRACT

A coupling device configured to transmit a rotational force between a first shaft and a second shaft, the device including a first coupling member mounted on the first shaft, a second coupling member mounted on the second shaft, and an intermediate member disposed between the first coupling member and the second coupling member, and configured to allow misalignment between the first shaft and the second shaft. The second coupling member includes a base member configured to be fixed to the intermediate member by a first fastening device, and a shaft mounting member configured to relatively non-rotatably be mounted on the second shaft, the shaft mounting member having a long hole extending along a circumferential direction of the above-described axis
(Continued)

and being configured to detachably be fixed to the base member by a second fastening device inserted through the long hole.

9 Claims, 8 Drawing Sheets

(58) Field of Classification Search
    USPC .................................................. 464/98, 99
    See application file for complete search history.

(56) References Cited

U.S. PATENT DOCUMENTS

| | | | | |
|---|---|---|---|---|
| 2,250,448 | A * | 7/1941 | Edwards | F16D 1/12 |
| | | | | 464/89 |
| 2,924,121 | A * | 2/1960 | Hart | F16D 3/40 |
| | | | | 74/661 |
| 4,469,014 | A * | 9/1984 | Nelson | F15B 15/24 |
| | | | | 403/337 |
| 11,009,053 | B2 * | 5/2021 | Pettey | F16D 1/0864 |
| 2008/0038052 | A1 * | 2/2008 | Dalsgaard | F16D 1/0864 |
| | | | | 403/362 |

FOREIGN PATENT DOCUMENTS

| | | | |
|---|---|---|---|
| DE | 102016216436 A1 | 3/2017 | |
| JP | 61-87227 U | 6/1966 | |
| JP | 61087227 U * | 6/1986 | ............... F16D 3/78 |
| JP | 3-17425 U | 2/1991 | |
| JP | 3-80127 U | 8/1991 | |
| JP | 3-85726 U | 8/1991 | |
| JP | 10-89374 A | 4/1998 | |
| JP | 11-51070 A | 2/1999 | |
| JP | 2002-372068 A | 12/2002 | |
| WO | WO-9116550 A1 * | 10/1991 | ............... F16D 3/79 |

OTHER PUBLICATIONS

International Search Report for PCT/JP2020/021334 (PCT/ISA/210) dated Aug. 4, 2020.

Written Opinion of the International Searching Authority for PCT/JP2020/021334 (PCT/ISA/237) dated Aug. 4, 2020.

Chinese Office Action and Search Report for Chinese Application No. 202080021795.8, dated Mar. 25, 2023, with English translation.

* cited by examiner

COUPLING DEVICE AND ROTATIONAL PHASE ADJUSTMENT METHOD FOR COUPLING DEVICE

TECHNICAL FIELD

The present disclosure relates to a coupling device for transmitting a rotational force between a pair of rotational shafts and a rotational phase adjustment method for the coupling device.

BACKGROUND

A coupling device for transmitting a rotational force between a pair of rotational shafts includes a flexible coupling configured to allow misalignment (eccentricity, declination, and displacement of a distance between axial ends) between axial centers of the pair of shafts (Patent Document 1).

Patent Document 1 discloses the flexible coupling that includes a driving-side coupling connected to a driving shaft, a driven-side coupling connected to a driven shaft, and an intermediate member disposed between the driving shaft and the driven shaft to transmit the rotational force, and absorbing the misalignment between the axial centers of the driving shaft and the driven shaft. In addition, Patent Document 1 discloses that the above-described intermediate member includes a metal plate spring having flexibility and restorability.

The above-described flexible coupling may connect a driving shaft of a diesel engine and a driven shaft of a mechanical fuel injection pump. The mechanical fuel injection pump is a device which is operated by a driving force transmitted from the driving shaft, pressurizes fuel used for the diesel engine, and pumps, to the diesel engine, the fuel pressurized to have a high pressure corresponding to an injection pressure. The fuel pumped to the diesel engine is injected into a combustion chamber. In the mechanical fuel injection pump, an injection timing of the fuel is decided in accordance with a rotational phase of the driven shaft. Thus, when the driving shaft and the driven shaft are connected, a relative rotational phase of the driven shaft to the driving shaft is adjusted. Further, the injection timing may be changed in accordance with a usage of the diesel engine, that is, the relative rotational phase of the driven shaft to the driving shaft may be readjusted.

CITATION LIST

Patent Literature

Patent Document 1: JP2002-372068A

SUMMARY

Technical Problem

As a means for easily performing an adjustment operation of the relative rotational phase of the driven shaft to the driving shaft, it is considered that a fastening bolt hole (circular hole) formed in the circumferential direction of an axis of the driving-side coupling is transformed into a long hole widened in the circumferential direction by a necessary phase change amount, and a rotational phase of the driving-side coupling is shifted with respect to a rotational phase of the driven-side coupling or the metal plate spring in order to obtain a desired injection timing. However, if the fastening bolt hole is transformed into the long hole, the following problems arise.

The driving-side coupling is fastened to the metal plate spring (intermediate member) via a fastening bolt or nut, and a seating surface of the fastening bolt or nut is in close contact with an opening end edge of the fastening bolt hole directly or via a washer. The metal plate spring is connected not only to the driving-side coupling but also to the driven-side coupling, and is thus flexed in order to absorb misalignment between the axial centers of the driving shaft and the driven shaft. The fastening bolt for fastening the metal plate spring to the driving-side coupling receives, from the metal plate spring, a restoring force of restoring the metal plate spring to an original shape. The above-described restoring force may also act in an extension direction of the long hole.

If the fastening bolt hole is transformed into the long hole, the driving-side coupling has a non-uniform distribution of a contact area with the bolt or the like around the axis of the bolt inserted through the fastening bolt hole, and a fastening force is also non-uniformly transmitted. That is, the above-described fastening force does not greatly act in the extension direction of the long hole. Thus, when the fastening bolt is applied with a force from a direction along the extension direction of the long hole from the metal plate spring, the driving-side coupling having the long hole may cause slippage with respect to the fastening bolt. If the driving-side coupling slips, the coupling device may be broken.

In view of the above issues, an object of at least one embodiment of the present invention is to provide the coupling device capable of easily adjusting the relative rotational phase of the pair of shafts and preventing occurrence of slippage in the coupling device.

Solution to Problem (1) A coupling device according to at least one embodiment of the present invention is a coupling device configured to transmit a rotational force between a first shaft and a second shaft, the device including a first coupling member configured to relatively non-rotatably be mounted on the above-described first shaft, a second coupling member configured to relatively non-rotatably be mounted on the above-described second shaft, and an intermediate member disposed between the above-described first coupling member and the above-described second coupling member in an extension direction of an axis of the above-described coupling device, and configured to absorb misalignment between the above-described first shaft and the above-described second shaft. The above-described second coupling member includes a base member configured to be fixed to the above-described intermediate member by a first fastening device, and a shaft mounting member configured to relatively non-rotatably be mounted on the above-described second shaft, the shaft mounting member having a long hole extending along a circumferential direction of the above-described axis and being configured to detachably be fixed to the above-described base member by a second fastening device inserted through the above-described long hole.

With the above configuration (1), the second coupling member includes the base member configured to be fixed to the intermediate member by the first fastening device, and the shaft mounting member which has the long hole extending along the circumferential direction of the axis and is configured to detachably be fixed to the base member by the second fastening device inserted through the long hole. That is, the second coupling member can be divided into two members, namely, the base member and the shaft mounting member, and the intermediate member is fixed to not the shaft mounting member having the long hole, but the base member. Thus, even if the intermediate member is deformed when absorbing the above-described misalignment, and a restoring force of restoring to an original shape is generated, the above-described restoring force acts on the base member via the first fastening device. That is, it is possible to prevent the above-described restoring force from acting on the shaft mounting member having the long hole, making it possible to prevent slippage of the shaft mounting member.

Further, with the above configuration (1), fixing of the shaft mounting member to the base member by the second fastening device is released, the shaft mounting member is relatively rotated to the base member such that a position where the second fastening device is inserted through the long hole is shifted, and then the shaft mounting member is fixed to the base member by the second fastening device, allowing the coupling device to easily adjust the relative rotational phase of the shaft mounting member to the base member. The base member is fixed to, via the intermediate member, the first coupling member relatively non-rotatably mounted on the first shaft. Further, the shaft mounting member is relatively non-rotatably mounted on the second shaft. Thus, adjusting the relative rotational phase of the shaft mounting member to the base member, it is possible to adjust the relative rotational phase of the second shaft to the first shaft.

(2) In some embodiments, in the coupling device according to the above configuration (1), one member of the above-described base member and the above-described shaft mounting member includes a protruding shaft portion which protrudes from an end surface facing another end surface to be coaxial with the above-described axis in the extension direction of the above-described axis and is formed to have a circular cross-section orthogonal to the above-described axis, and the other member of the above-described base member and the above-described shaft mounting member includes a fitting hole portion which is disposed in the above-described another end surface and is configured to be fitted with the above-described protruding shaft portion, the other member having an inner circumferential surface formed to have a circular cross-section orthogonal to the above-described axis.

With the above configuration (2), the axial center of the shaft mounting member and the axial center of the base member are aligned by fitting the above-described protruding shaft portion into the above-described fitting hole portion, allowing the shaft mounting member to prevent eccentricity of the axial center of the shaft mounting member with respect to the axial center of the base member. With the configuration of preventing eccentricity of the axial center of the shaft mounting member with respect to the axial center of the base member, a worker can perform work to adjust the relative rotational phase of the shaft mounting member to the base member more easily.

(3) In some embodiments, in the coupling device according to the above configuration (2), the above-described end surface facing the above-described another end surface of the above-described one member includes a shaft portion-side end surface located on an outer circumferential side of the above-described protruding shaft portion and extending along a direction intersecting with the above-described axis, the above-described another end surface of the above-described other member includes a hole portion-side end surface located on an outer circumferential side of the above-described fitting hole portion and extending along the direction intersecting with the above-described axis, and the above-described one member and the above-described other member are configured such that the above-described shaft portion-side end surface and the above-described hole portion-side end surface are disposed in contact with each other.

With the above configuration (3), since the shaft portion-side end surface located on the outer circumferential side of the protruding shaft portion and the hole portion-side end surface located on the outer circumferential side of the fitting hole portion are disposed in contact with each other, the second coupling member (the base member and the mounting member) can increase the strength (rigidity) of the second coupling member. Further, with the above configuration (3), since the shaft portion-side end surface and the hole portion-side end surface are disposed in contact with each other, the base member and the mounting member can prevent declination of the axial center of the shaft mounting member with respect to the axial center of the base member. With the configuration of preventing declination of the axial center of the shaft mounting member with respect to the axial center of the base member, the worker can perform the work to adjust the relative rotational phase of the shaft mounting member to the base member more easily.

(4) In some embodiments, in the coupling device according to any one of the above configurations (1) to (3), the above-described intermediate member includes at least one plate spring member which extends along a direction intersecting with the above-described axis and is configured to be elastic flexible along the direction intersecting with the above-described axis.

With the above configuration (4), since the at least one plate spring member is configured to be elastic flexible along the direction intersecting with the axis, the coupling device can absorb misalignment between the axial centers of the first shaft and the second shaft by elastically flexing the plate spring member.

(5) In some embodiments, in the coupling device according to the above configuration (4), the above-described at least one plate spring member includes a first fastened portion configured to be fastened to the above-described first coupling member, and a second fastened portion configured to be fastened to the above-described base member.

With the above configuration (5), the plate spring member is fastened to the first coupling member in the first fastened portion, and is fastened to the base member in the second fastened portion. The coupling device including the above-described plate spring member is a so-called single disk type coupling. Such coupling device can have a decreased total length in the extension direction of the axis, and thus can be installed even in a narrow gap between the first shaft and the second shaft.

(6) In some embodiments, in the coupling device according to any one of the above configurations (1) to (5), the above-described first coupling member includes a first flange portion extending along a direction intersecting with the above-described axis, and the above-described first flange portion includes a first coupling-side fastened portion configured to be fastened to the above-described intermediate member by a third fastening device, and a first escape recess formed on an end surface on a side of the above-described intermediate member and configured to allow the above-described first fastening device to loosely be fitted into the first escape recess.

With the above configuration (6), the first coupling member is fastened to the intermediate member in the first coupling-side fastened portion of the first flange. Further, the first coupling member is configured to allow the first fastening device to loosely be fitted into the first escape recess formed on the end surface of the above-described first flange on the side of the intermediate member. Providing the first escape recess, it is possible to reduce an interval between the intermediate member and the first flange. Reducing the interval between the intermediate member and the first flange, it is possible to decrease the total length of the coupling device, and to improve responsiveness of the intermediate member, to which the rotational force is transmitted from the first coupling member, to the first coupling member.

(7) In some embodiments, in the coupling device according to the above configuration (6), the above-described base member includes a second flange portion extending along the direction intersecting with the above-described axis, and the above-described second flange portion includes a second coupling-side fastened portion configured to be fastened to the above-described intermediate member by the above-described first fastening device, and a second escape recess formed on the end surface on the side of the above-described intermediate member and configured to allow the above-described third fastening device to loosely be fitted into the second escape recess.

With the above configuration (7), the base member is fastened to the intermediate member in the second coupling-side fastened portion of the second flange. Further, the base member is configured to allow the third fastening device to loosely be fitted into the second escape recess formed on the end surface of the above-described second flange portion on the side of the intermediate member. Providing the second escape recess, it is possible to reduce an interval between the intermediate member and the second flange. Reducing the interval between the intermediate member and the second flange, it is possible to decrease the total length of the coupling device, and to improve responsiveness of the second coupling member, to which the rotational force is transmitted from the intermediate member, to the intermediate member.

(8) In some embodiments, in the coupling device according to any one of the above configurations (1) to (7), the above-described intermediate member is configured to be fixed to the above-described first coupling member and the above-described base member with a gap in the extension direction of the above-described axis.

With the above configuration (8), the intermediate member is fixed to the first coupling member and the base member with the gap in the extension direction of the axis. Thus, the intermediate member is not constrained by the first coupling member and the base member, it is possible to rapidly absorb misalignment between the axial centers of the first shaft and the second shaft caused when the rotational force is transmitted.

(9) In some embodiments, in the coupling device according to any one of the above configurations (1) to (8), one of the above-described first shaft and the above-described second shaft includes a driving shaft of a diesel engine, and the other of the above-described first shaft and the above-described second shaft includes a driven shaft of a fuel injection pump configured to pump liquid fuel to the above-described diesel engine.

With the above configuration (9), it is possible to easily perform work to adjust the rotational phase between the driving shaft of the diesel engine and the driven shaft of the fuel injection pump.

(10) A rotational phase adjustment method for a coupling device according to at least one embodiment of the present invention is a rotational phase adjustment method for a coupling device configured to transmit a rotational force between a first shaft and a second shaft, the above-described coupling device including a first coupling member configured to relatively non-rotatably be mounted on the above-described first shaft, a second coupling member configured to relatively non-rotatably be mounted on the above-described second shaft, and an intermediate member disposed between the above-described first coupling member and the above-described second coupling member in an extension direction of an axis of the above-described coupling device, and configured to allow misalignment between the above-described first shaft and the above-described second shaft, the above-described second coupling member including a base member configured to be fixed to the above-described intermediate member by a first fastening device, and a shaft mounting member configured to relatively non-rotatably be mounted on the above-described second shaft, the shaft mounting member having a long hole extending along a circumferential direction of the above-described axis and being configured to detachably be fixed to the above-described base member by a second fastening device inserted through the above-described long hole, the rotational phase adjustment method for the above-described coupling device, including a relative rotation step of relatively rotating the above-described shaft mounting member to the above-described base member, and a fixing step of fixing the above-described shaft mounting member to the above-described base member by the above-described second fastening device, after the above-described relative rotation step.

With the above method (10), the rotational phase adjustment method for the coupling device includes the relative rotation step of relatively rotating the shaft mounting member to the base member, and the fixing step of fixing the shaft mounting member to the base member by the second fastening device after the relative rotation step. The rotational phase adjustment method for the coupling device relatively rotates the shaft mounting member to the base member so as to shift the position where the second fastening device is inserted through the long hole in the relative rotation step, and then fixes the shaft mounting member to the base member by the second fastening device in the fixing step. Such rotational phase adjustment method for the coupling device can easily adjust the relative rotational phase of the shaft mounting member to the base member, and can easily adjust the relative rotational phase of the second shaft to the first shaft.

Further, with the above method (10), the intermediate member is fixed to not the shaft mounting member having the long hole, but the base member. Thus, even if the intermediate member is deformed when absorbing the above-described misalignment, and a restoring force of restoring to an original shape is generated, the above-described restoring force acts on the base member via the first fastening device. That is, it is possible to prevent the above-described restoring force from acting on the shaft mounting member having the long hole, making it possible to prevent slippage of the shaft mounting member.

Advantageous Effects

According to at least one embodiment of the present invention, provided is a coupling device capable of easily adjusting a relative rotational phase of a pair of shafts and preventing occurrence of slippage in the coupling device.

DETAILED DESCRIPTION

Figure 1:
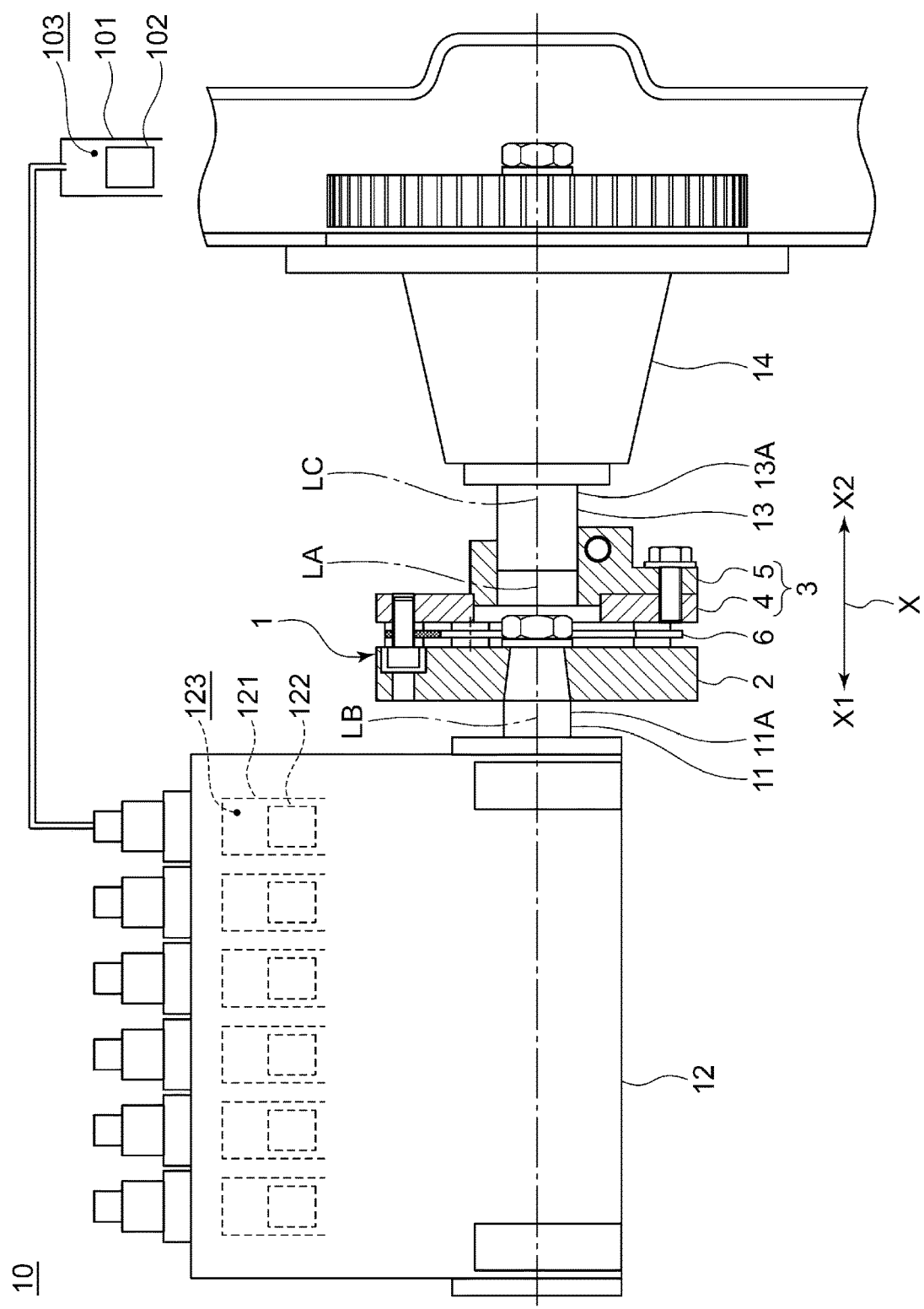
FIG. 1 is a schematic configuration view schematically showing the configuration of a diesel engine including a coupling device according to an embodiment of the present invention.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including" or "having" one constitutional element is not an exclusive expression that excludes the presence of other constitutional elements.

The same configurations are indicated by the same reference characters and may not be described again in detail.

FIG. 1 is a schematic configuration view schematically showing the configuration of a diesel engine including a coupling device according to an embodiment of the present invention.

As shown in FIG. 1, a coupling device 1 according to some embodiments is connected to a first shaft 11 and a second shaft 13, and is configured to transmit a rotational force between the first shaft 11 and the second shaft 13.

In the illustrated embodiment, as shown in FIG. 1, the coupling device 1 is mounted on a diesel engine 10. The first shaft 11 includes a driven shaft 11A, and the second shaft 13 includes a driving shaft 13A.

As shown in FIG. 1, the diesel engine 10 includes a combustion chamber 103 which is defined by a cylinder 101 and a piston 102 disposed in the cylinder 101, a fuel injection pump 12 including the driven shaft 11A, a pump driving unit 14 including the driving shaft 13A, and the above-described coupling device 1 which is connected to the driven shaft 11A and the driving shaft 13A disposed such that tip surfaces thereof are opposite to each other and is configured to transmit the rotational force between the driven shaft 11A and the driving shaft 13A.

As shown in FIG. 1, the coupling device 1 is connected at one end in an extension direction of an axis LA to the driven shaft 11A, and connected at another end in the extension direction of the axis LA to the driving shaft 13A.

In the illustrated embodiment, as shown in FIG. 1, each of an axis LB of the driven shaft 11A and an axis LC of the driving shaft 13A is disposed coaxially with the axis LA of the coupling device 1.

The axis LB of the driven shaft 11A and the axis LC of the driving shaft 13A may be eccentric or declinate with respect to the axis LA as long as the driven shaft 11A and the driving shaft 13A fall within a range (allowable range) capable of allowing misalignment between axial centers by an intermediate member 6 to be described later, and with eccentricity or declination within the above-described allowable range, the axis LB and the axis LC are disposed coaxially with the axis LA.

The driving shaft 13A is configured such that a driving force generated in the combustion chamber 103 is transmitted, and is configured to be rotatable about the axis LC by the driving force transmitted from the combustion chamber 103. As shown in FIG. 1, the driven shaft 11A is configured to be rotatable about the axis LB by the driving force (rotational force) transmitted from the driving shaft 13A via the coupling device 1.

In other words, as shown in FIG. 1, the fuel injection pump 12 is configured such that the driving force is transmitted by the pump driving unit 14 and the driven shaft 11A is rotated by the transmitted driving force.

As shown in FIG. 1, the fuel injection pump 12 is configured to pump high-pressure liquid fuel to the diesel engine 10. In the illustrated embodiment, as shown in FIG. 1, the fuel injection pump 12 is configured to mechanically be operated by the driving force (rotational force) transmitted from the pump driving unit 14.

In the embodiment shown in FIG. 1, the fuel injection pump 12 (mechanical fuel injection pump) is configured to internally define at least one (in FIG. 1, six) pumping chamber 123 defined by a cylinder 121 and a plunger 122, as shown in FIG. 1. The fuel injection pump 12 (mechanical fuel injection pump) is configured to pressurize liquid fuel, which is delivered into the pumping chamber 123 by the plunger 122 lifting/lowering in conjunction with a rotation of the driven shaft 11A and is used for the diesel engine 10, to a high pressure corresponding to an injection pressure, and to pump the liquid fuel pressurized in the pumping chamber 123 to the combustion chamber 103.

By spontaneous combustion of the liquid fuel pumped from the fuel injection pump 12 to the combustion chamber 103 and injected into the combustion chamber 103, the diesel engine 10 generates the above-described driving force of rotating the driving shaft 13A.

If the fuel injection pump 12 is the above-described mechanical fuel injection pump, an injection timing of the liquid fuel to the combustion chamber 103 is decided in accordance with a rotational phase of the driven shaft 11A. In a certain embodiment, the fuel injection pump 12 is adjusted such that a relative rotational phase of the driving shaft 13A to the driven shaft 11A has a predetermined angle so the liquid fuel is injected into the combustion chamber 103, when the piston 102 is located at a predetermined position just before the compression top dead center.

Figure 2:
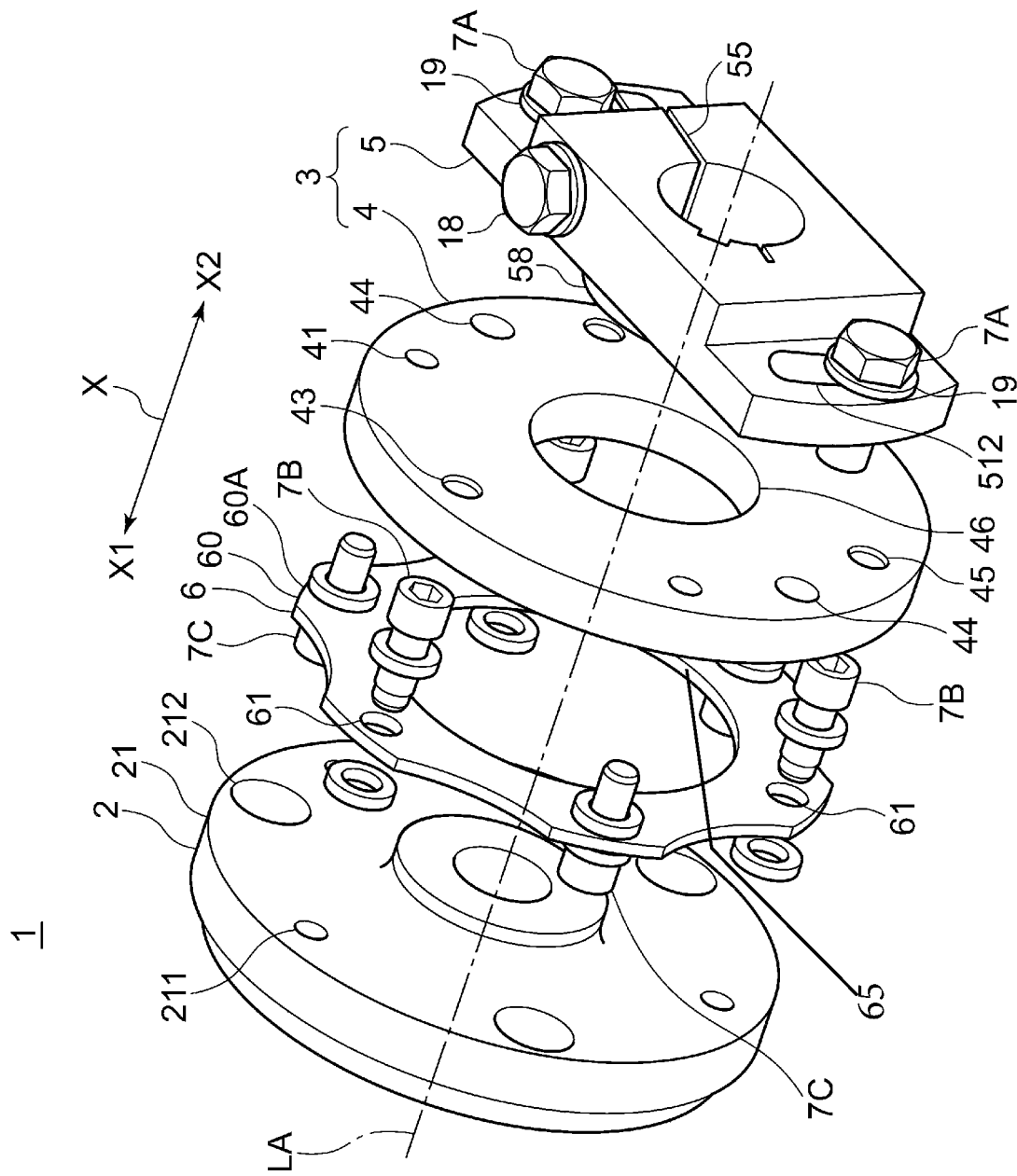
FIG. 2 is a schematic exploded perspective view of the coupling device according to an embodiment of the present invention.

FIG. 2 is a schematic exploded perspective view of the coupling device according to an embodiment of the present invention.

The following description will be given, assuming that the extension direction of the axis LA of the coupling device 1 is an X-axis direction, one side of the X-axis direction is an X1 side, and another side of the X-axis direction is an X2 side. Further, assume that a side where the fuel injection pump 12 is located is the above-described X1 side, and a side where the pump driving unit 14 is located is the above-described X2 side.

As shown in FIG. 2, the coupling device 1 according to some embodiments includes a driven-side coupling member 2, the intermediate member 6, and a driving-side coupling member 3, in order from the X1 side. The driving-side coupling member 3 includes a base member 4 and a shaft mounting member 5, in order from the X1 side. That is, the intermediate member 6 is disposed between the driven-side coupling member 2 and the base member 4 in the X-axis direction, and the base member 4 is disposed between the intermediate member 6 and the shaft mounting member 5 in the X-axis direction.

As shown in FIG. 2, each axis of the driven-side coupling member 2, the intermediate member 6, the base member 4, and the shaft mounting member 5 is disposed coaxially with the axis LA of the coupling device 1. Further, in a mounted state, the driven-side coupling member 2, the intermediate member 6, the base member 4, and the shaft mounting member 5 adjacent to each other in the X-axis direction are fixed to each other by fastening devices 7A to 7C, respectively.

Figure 3:
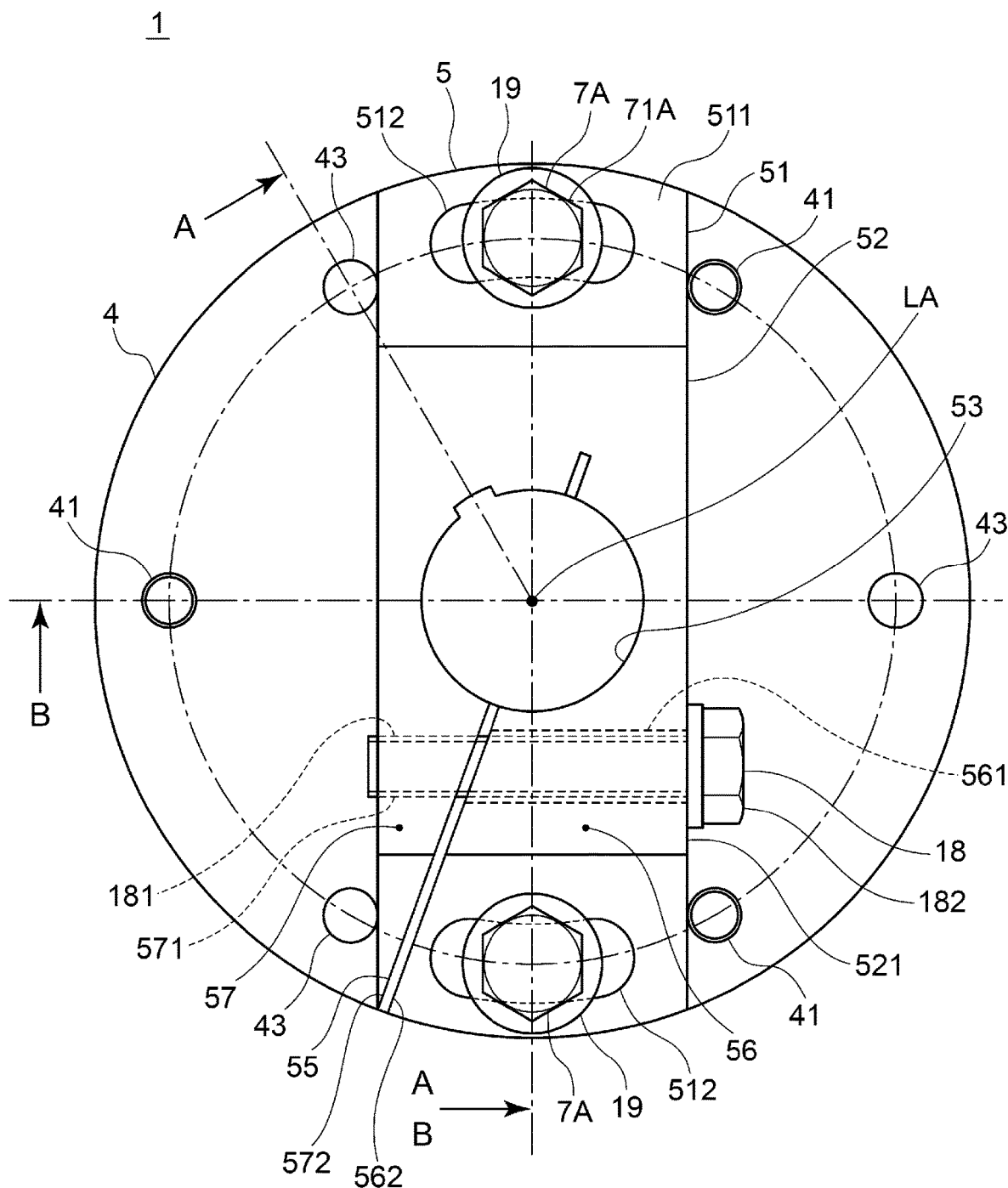
FIG. 3 is a schematic view schematically showing a state where the coupling device is viewed from a side of a pump driving unit according to an embodiment of the present invention.
Figure 4:
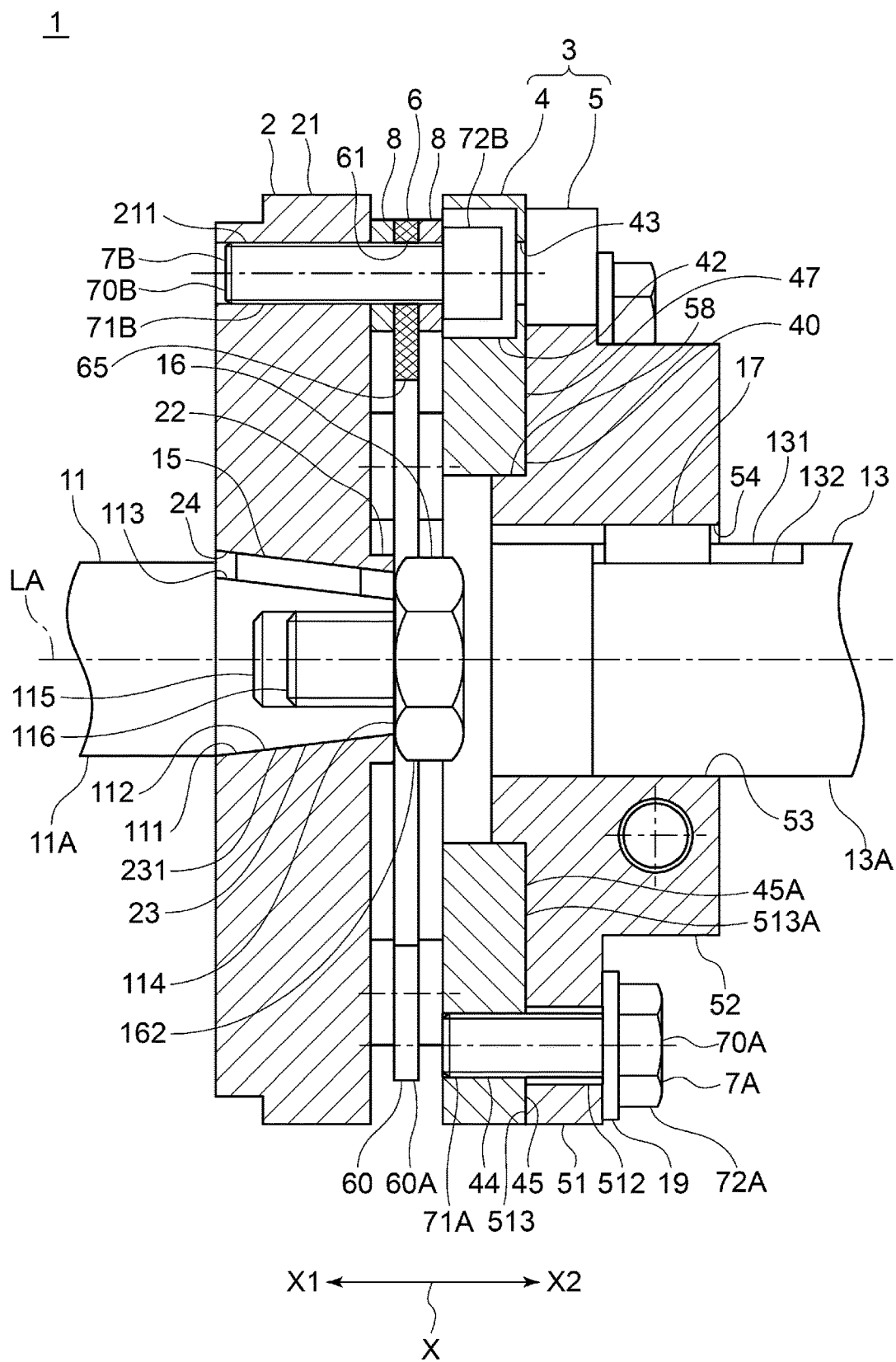
FIG. 4 is a cross-sectional view in a direction of arrow A shown in FIG. 3.
Figure 5:
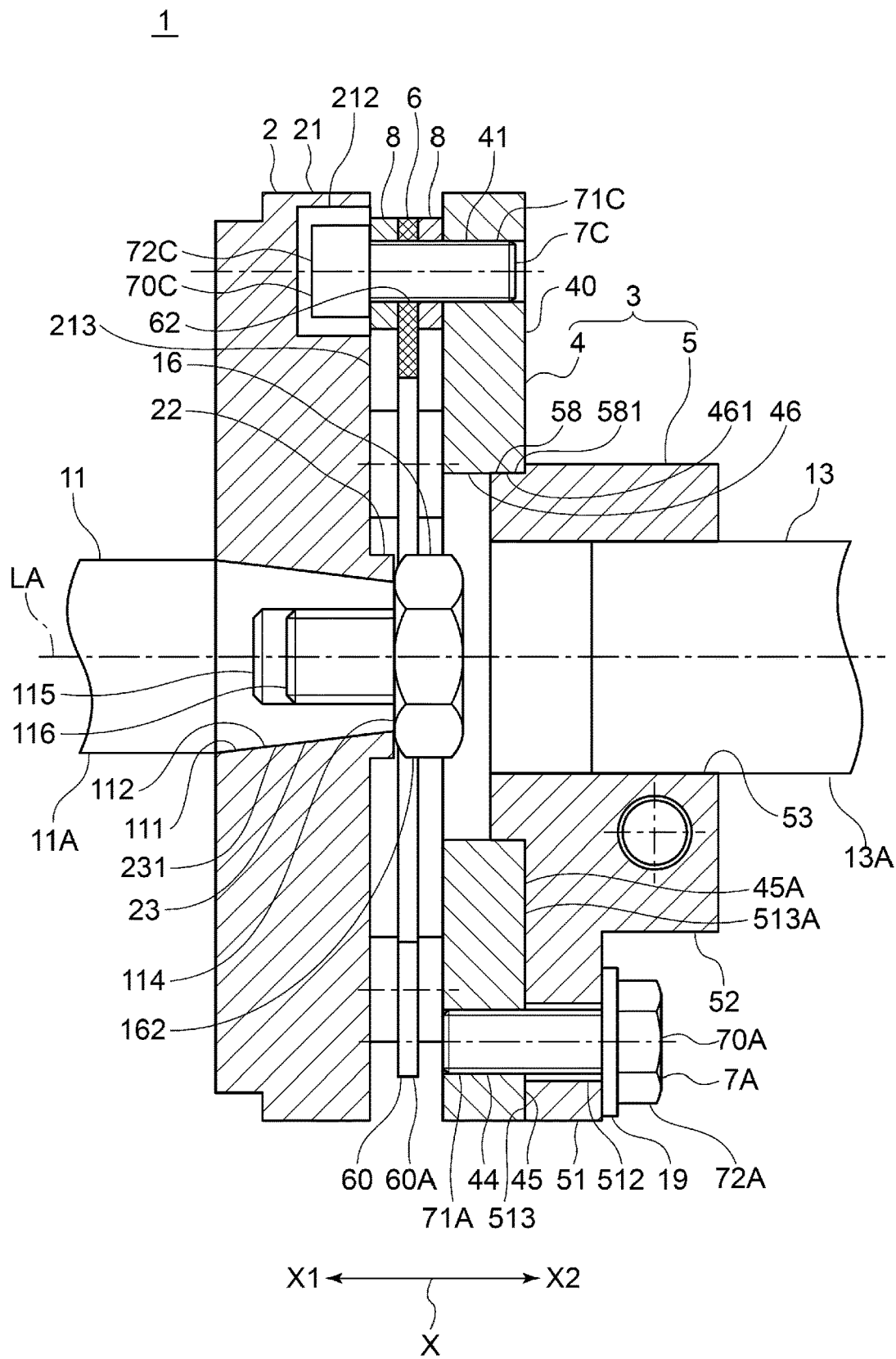
FIG. 5 is a cross-sectional view in a direction of arrow B shown in FIG. 3.

FIG. 3 is a schematic view schematically showing a state where the coupling device is viewed from a side of the pump driving unit according to an embodiment of the present invention. FIG. 4 is a cross-sectional view in a direction of arrow A shown in FIG. 3. FIG. 5 is a cross-sectional view in a direction of arrow B shown in FIG. 3.

As shown in FIG. 4, the driven-side coupling member 2 is configured to relatively non-rotatably be mounted on the driven shaft 11A.

In the illustrated embodiment, as shown in FIG. 4, the driven-side coupling member 2 includes a flange portion 21 extending along a direction intersecting with (orthogonal to) the X-axis direction, and a protruding portion 22 protruding from the middle of the flange portion 21 to the X2 side along the X-axis direction. In the center of the driven-side coupling member 2, a shaft insertion hole 23 penetrating along the axis LA is formed.

As shown in FIG. 4, the shaft insertion hole 23 has a tapered surface 231 with an inner diameter gradually decreasing from the X1 side toward the X2 side. The tapered surface 231 is disposed over an entire length in the X-axis direction.

As shown in FIG. 4, a distal end portion 111 of the driven shaft 11A has a tapered surface 112 with an outer diameter gradually decreasing from the X1 side (proximal end side) toward the X2 side (distal end side), and is configured to be fittable into the shaft insertion hole 23 from the X1 side.

In the illustrated embodiment, as shown in FIG. 4, the driven shaft 11A has a bolt hole 115 (screwed portion) formed to be recessed from a tip surface 114 of the distal end portion 111 along the X-axis direction. The driven shaft 11A is fixed to the driven-side coupling member 2 by screwing a shaft portion 161 (screw portion) of a fastening member 16 (bolt) to the bolt hole 115 from the X2 side, with the distal end portion 111 being inserted into the shaft insertion hole 23. A head portion 162 of the fastening member 16 has an external dimension larger than an X2-side opening of the shaft insertion hole 23, making it impossible to pull the distal end portion 111 of the driven shaft 11A out of the shaft insertion hole 23. In this case, the driven-side coupling member 2 is relatively non-rotatably mounted on the driven shaft 11A.

In the illustrated embodiment, the fastening member 16 includes the bolt. However, in some other embodiments, the fastening member 16 may include a nut. That is, in some other embodiments, the driven shaft 11A does not have the bolt hole 115, and the driven shaft 11A may be fixed to the driven-side coupling member 2 by screwing a female thread portion (screwed portion) of the fastening member 16 (nut) to a male thread portion (screw portion) formed on an outer peripheral surface of the protruding portion protruding to the X2 side from the shaft insertion hole 23. The fastening member 16 (nut) is configured to have the external dimension larger than the X2-side opening of the shaft insertion hole 23. In this case as well, the driven-side coupling member 2 is relatively non-rotatably mounted on the driven shaft 11A. Likewise, the fastening member 16 shown in FIG. 5 may be the bolt or the nut.

In the illustrated embodiment, as shown in FIG. 4, keyways 24, 113 are, respectively, formed in the shaft insertion hole 23 of the driven-side coupling member 2 and the distal end portion 111 of the driven shaft 11A. The driven-side coupling member 2 is relatively non-rotatably connected to the driven shaft 11A by key fastening via a key 15 fitted into both of the keyway 24 and the keyway 113.

As shown in FIG. 5, the shaft mounting member 5 (driving-side coupling member 3) is configured to relatively non-rotatably be mounted on the driving shaft 13A.

In the illustrated embodiment, as shown in FIG. 5, the shaft mounting member 5 includes a flange portion 51 extending along the direction intersecting with (orthogonal to) the X-axis direction, and a hub 52 protruding from the middle of the flange portion 51 to the X2 side along the X-axis direction. In the center of the shaft mounting member 5, a shaft insertion hole 53 penetrating along the axis LA is formed. As shown in FIG. 5, a distal end portion 131 of the driving shaft 13A is configured to be fittable into the shaft insertion hole 53 from the X2 side.

Further, in the illustrated embodiment, as shown in FIG. 5, keyways 54, 132 are, respectively, formed in the shaft insertion hole 53 of the shaft mounting member 5 and the distal end portion 131 of the driving shaft 13A. The shaft mounting member 5 is relatively non-rotatably connected to the driving shaft 13A by key fastening via a key 17 fitted into both of the keyway 54 and the keyway 132.

As shown in FIG. 3, the distal end portion 131 of the driving shaft 13A is fixed to be incapable of being pulled out of the shaft insertion hole 53 of the shaft mounting member 5, by decreasing an internal dimension of the shaft insertion hole 53 with a fastening force of a bolt 18.

In the illustrated embodiment, in the shaft mounting member 5, a slot 55 extending along the radiation direction and dividing the shaft mounting member 5 in the circumferential direction is formed in the X-axis direction view as shown in FIG. 3. One section (right side in FIG. 3) divided by the slot 55 of the shaft mounting member 5 will be referred to as a first divided section 56, and another section (left side in FIG. 3) will be referred to as a second divided section 57.

As shown in FIG. 3, in the first divided section 56 of the hub 52, a through hole 561, which extends along a direction intersecting with (orthogonal to) an extension direction of the slot 55 and through which a shaft portion 181 of the bolt 18 can loosely be inserted, is formed in the X-axis direction view. Further, in the second divided section 57 of the hub 52, a bolt hole 571 is formed which extends along a coaxial direction with the through hole 561 and to which the shaft portion 181 of the bolt 18 can be screwed.

As shown in FIG. 3, the shaft portion 181 of the bolt 18 is inserted through the through hole 561 and is screwed to the bolt hole 571, as well as a head portion 182 of the bolt 18 is locked to a side surface 521 having an opening edge of the through hole 561 of the hub 52, making it possible to narrow a gap formed between an end surface 562 of the first divided section 56 and an end surface 572 of the second divided section 57. At this time, since the internal dimension of the shaft insertion hole 53 is also narrowed, the distal end portion 131 of the driving shaft 13A is tightened and fixed to the shaft insertion hole 53.

As shown in FIG. 3, the shaft mounting member 5 has at least one long hole 512 extending along the circumferential direction of the axis LA in a stepped surface 511 located on the X2 side of the flange portion 51. The long hole 512 is disposed on the outer circumferential side of the shaft insertion hole 53. The shaft mounting member 5 is configured to detachably be fixed to the base member 4 by the at least one fastening device 7A inserted through the at least one long hole 512.

In the illustrated embodiment, as shown in FIG. 3, the two long holes 512 are disposed symmetrically about the axis LA.

In the illustrated embodiment, as shown in FIG. 5, the fastening device 7A includes a bolt 70A, and a bolt hole 44 of the base member 4. The bolt 70A includes a shaft portion 71A with a thread portion being formed in at least a part of the outer peripheral surface, and a head portion 72A formed in a base end portion of the shaft portion 71A to have a larger diameter than the shaft portion 71A.

The shaft portion 71A the bolt 70A is inserted through the long hole 512 from the X2 side, and a tip of the shaft portion 71A protruding from the long hole 512 to the X1 side is screwed to the bolt hole 44, thereby fixing the shaft mounting member 5 to the base member 4. By loosening fastening with the bolt 70A, the shaft mounting member 5 and the base member 4 are unfixed. If the shaft mounting member 5 is not fixed to the base member 4, it is possible to shift the shaft mounting member 5 with respect to the base member 4 in the circumferential direction until the shaft portion 71A contacts an edge portion of the long hole 512 in the circumferential direction. That is, by loosening fastening with the bolt 70A, it is possible to adjust the relative rotational phase of the shaft mounting member 5 to the base member 4.

A washer 19 may be disposed between the head portion 72A of the bolt 70A and the stepped surface 511 of the shaft mounting member 5.

In the illustrated embodiment, as shown in FIG. 5, the base member 4 is formed into a plate annular shape that includes a flange portion 40 extending along the direction intersecting with (orthogonal to) the axis LA.

The intermediate member 6 is configured to absorb misalignment between the first shaft 11 and the second shaft 13. In the illustrated embodiment, the intermediate member 6 includes at least one elastic member 60 having flexibility and restorability. In the embodiments shown in FIGS. 2 and 4 to 6, the intermediate member 6 includes, as the elastic member 60, a plate spring member 60A extending along the direction intersecting with (orthogonal to) the X-axis direction.

As shown in FIG. 2, the plate spring member 60A is formed into a plate annular shape with a through hole 65 at a center, and includes at least one driven-side bolt insertion hole 61 and at least one driving-side bolt through hole 62 (see FIG. 6) on the outer circumferential side of the through hole 65.

In the illustrated embodiment, as shown in FIG. 2, the plurality of driven-side bolt insertion holes 61 and the plurality of driving-side bolt insertion holes 62 are uniformly disposed on the same circumference in the circumferential direction.

Figure 6:
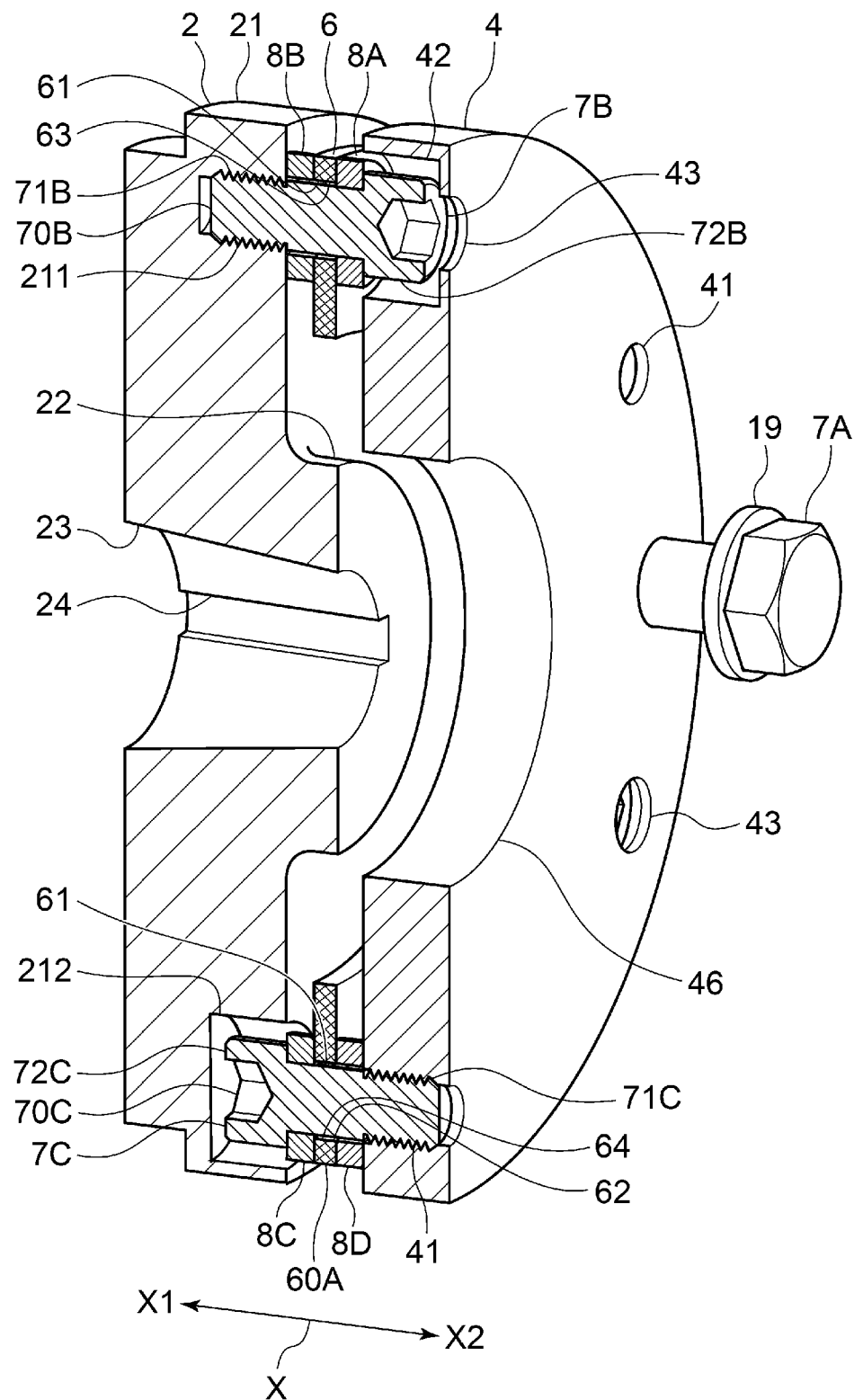
FIG. 6 is a partial cutout perspective cross-sectional view schematically showing the coupling device according to an embodiment of the present invention.

FIG. 6 is a partial cutout perspective cross-sectional view schematically showing the coupling device according to an embodiment of the present invention. In FIG. 6, the shaft mounting member 5 is not depicted.

As shown in FIG. 6, the driven-side coupling member 2 is configured to be fixed to the plate spring member 60A (intermediate member 6) by the at least one fastening device 7B. As shown in FIG. 6, the base member 4 is configured to be fixed to the plate spring member 60A (intermediate member 6) by the at least one fastening device 7C.

In the illustrated embodiment, as shown in FIG. 6, the fastening device 7B includes a bolt 70B including a shaft portion 71B and a head portion 72B as with the bolt 70A, and a bolt hole 211 of the driven-side coupling member 2. The shaft portion 71B of the bolt 70B is inserted through a driven-side bolt insertion hole 61 of the plate spring member 60A and is screwed to the bolt hole 211 of the driven-side coupling member 2, thereby fixing the driven-side coupling member 2 to the plate spring member 60A.

In the illustrated embodiment, as shown in FIG. 6, the fastening device 7C includes a bolt 70C including a shaft portion 71C and a head portion 72C as with the bolt 70A, and a bolt hole 41 of the base member 4. The shaft portion 71C of the bolt 70C is inserted through a driving-side bolt insertion hole 62 of the plate spring member 60A and is screwed to the bolt hole 41 of the base member 4, thereby fixing the base member 4 to the plate spring member 60A.

The plate spring member 60A has lower rigidity than the driven-side coupling member 2 and the base member 4, and is flexed or twisted in order to absorb misalignment between the first shaft 11 and the second shaft 13.

For example, as shown in FIG. 2, the coupling device 1 according to some embodiments includes the above-described driven-side coupling member 2 (first coupling member), the above-described intermediate member 6, and the above-described driving-side coupling member 3 (second coupling member). The above-described driving-side coupling member 3 includes the above-described base member 4 and the above-described shaft mounting member 5.

With the above configuration, the driving-side coupling member 3 (second coupling member) includes the base member 4 configured to be fixed to the intermediate member 6 by the fastening device 7C (first fastening device), and the shaft mounting member 5 which has the long hole 512 extending along the circumferential direction of the axis LA and is configured to detachably be fixed to the base member 4 by the fastening device 7A (second fastening device) inserted through the long hole 512. That is, the driving-side coupling member 3 can be divided into two members, namely, the base member 4 and the shaft mounting member 5, and the intermediate member 6 is fixed to not the shaft mounting member 5 having the long hole 512, but the base member 4. Thus, even if the intermediate member 6 is deformed when absorbing the above-described misalignment, and a restoring force of restoring to an original shape is generated, the above-described restoring force acts on the base member 4 via the fastening device 7C. That is, it is possible to prevent the above-described restoring force from acting on the shaft mounting member 5 having the long hole 512, making it possible to prevent slippage of the shaft mounting member 5.

Further, with the above configuration, fixing of the shaft mounting member 5 to the base member 4 by is released, the shaft mounting member 5 is relatively rotated to the base member 4 such that a position where the shaft portion 71A of the bolt 70A (fastening device 7A) is inserted through the long hole 512 is shifted, and then the shaft mounting member 5 is fixed to the base member 4 by the fastening device 7A, allowing the coupling device 1 to easily adjust the relative rotational phase of the shaft mounting member 5 to the base member 4. The base member 4 is fixed to, via the intermediate member 6, the driven-side coupling member 2 relatively non-rotatably mounted on the driven shaft 11A. Further, the shaft mounting member 5 is relatively non-rotatably mounted on the driving shaft 13A. Thus, adjusting the relative rotational phase of the shaft mounting member 5 to the base member 4, it is possible to adjust the relative rotational phase of the driving shaft 13A to the driven shaft 11A.

In some embodiments described above, the driven-side coupling member 2 is the first coupling member, and the driving-side coupling member 3 is the second coupling member. However, the driving-side coupling member 3 may be the first coupling member, and the driven-side coupling member 2 may be the second coupling member. Further, in some embodiments described above, the driving-side coupling member 3 includes the above-described base member 4 and the above-described shaft mounting member 5. However, the driven-side coupling member 2 may include the above-described base member 4 and the above-described shaft mounting member 5.

In some embodiments, as shown in FIG. 5, the above-described shaft mounting member 5 includes a protruding shaft portion 58 which protrudes coaxially with the axis LA from an end surface 513 opposite to an end surface 45 located on the X2 side of the base member 4 in the X-axis direction. The above-described base member 4 includes a fitting hole portion 46 disposed coaxially with the axis LA in the above-described end surface 45 and configured to be fitted with the protruding shaft portion 58. Each of an outer circumferential surface 581 of the protruding shaft portion 58 and an inner circumferential surface 461 of the fitting hole portion 46 is formed such that a cross-sectional shape (side cross-sectional shape) orthogonal to the axis LA has a circular shape.

In the illustrated embodiment, as shown in FIG. 5, the protruding shaft portion 58 is inserted into the fitting hole portion 46 and is configured to slidingly be rotatable in a state where the outer circumferential surface 581 is in contact with the inner circumferential surface 461 of the fitting hole portion 46.

With the above configuration, the axial center of the shaft mounting member 5 and the axial center of the base member 4 are aligned by fitting the protruding shaft portion 58 into the fitting hole portion 46, allowing the shaft mounting member 5 to prevent eccentricity of the axial center of the shaft mounting member 5 with respect to the axial center of the base member 4. With the configuration of preventing eccentricity of the axial center of the shaft mounting member 5 with respect to the axial center of the base member 4, a worker can perform work to adjust the relative rotational phase of the shaft mounting member 5 to the base member 4 more easily.

In some embodiments described above, the above-described shaft mounting member 5 includes the above-described protruding shaft portion 58, and the above-described base member 4 includes the above-described fitting hole portion 46. However, in some other embodiments, the above-described shaft mounting member 5 may include the above-described fitting hole portion 46, and the above-described base member 4 may include the above-described protruding shaft portion 58.

In some embodiments, as shown in FIG. 5, the end surface 513 of the shaft mounting member 5 described above includes a shaft portion-side end surface 513A located on the outer circumferential side of the protruding shaft portion 58 and extending along the direction intersecting with the axis LA. The end surface 45 of the base member 4 described above includes a hole portion-side end surface 45A located on the outer circumferential side of the fitting hole portion 46 and extending along the direction intersecting with the axis LA. The base member 4 and the shaft mounting member 5 are configured such that the hole portion-side end surface 45A and the shaft portion-side end surface 513A are disposed in contact with each other.

In the illustrated embodiment, as shown in FIG. 5, the shaft portion-side end surface 513A includes a portion in the vicinity of the inner circumferential edge adjacent to a proximal end-side edge portion on the outer circumferential surface 581 of the protruding shaft portion 58. The hole portion-side end surface 45A includes a portion in the vicinity of the inner circumferential edge adjacent to an opening edge of the fitting hole portion 46.

With the above configuration, since the shaft portion-side end surface 513A located on the outer circumferential side of the protruding shaft portion 58 and the hole portion-side end surface 45A located on the outer circumferential side of the fitting hole portion 46 are disposed in contact with each other, the driving-side coupling member 3 (base member 4 and the shaft mounting member 5) can increase the strength (rigidity) of the driving-side coupling member 3. Further, with the above configuration, since the shaft portion-side end surface 513A and the hole portion-side end surface 45A are disposed in contact with each other, the base member 4 and the shaft mounting member 5 can prevent declination of the axial center of the shaft mounting member 5 with respect to the axial center of the base member 4. With the configuration of preventing declination of the axial center of the shaft mounting member 5 with respect to the axial center of the base member 4, the worker can perform the work to adjust the relative rotational phase of the shaft mounting member 5 to the base member 4 more easily.

In some embodiments, the above-described intermediate member 6 includes the at least one plate spring member 60A which extends along the direction intersecting with the axis LA and is configured to be elastic flexible at least along the direction intersecting with the axis LA. In the illustrated embodiment, the plate spring member 60A is configured to be elastic flexible along the X-axis direction and along the circumferential direction of the axis LA as well. Further, the at least one plate spring member 60A may include a plurality of plate springs which extend along the direction intersecting with the axis LA and are laminated in the X-axis direction.

With the above configuration, since the at least one plate spring member 60A is configured to be elastic flexible along the direction intersecting with the axis LA, the coupling device 1 can absorb misalignment between the axial centers of the driven shaft 11A and the driving shaft 13A by elastically flexing the plate spring member 60A.

In some embodiments, the above-described driven-side coupling member 2 includes the above-described flange portion 21 (first flange portion) extending along the direction intersecting with (orthogonal to) the axis LA. As shown in FIG. 4, the above-described flange portion 21 includes the bolt hole 211 (first coupling-side fastened portion) configured to be fastened to the intermediate member 6 by the fastening device 7B. Further, as shown in FIG. 5, the above-described flange portion 21 includes a first escape recess 212 formed on an end surface 213 on the side of the intermediate member 6 and configured to allow the bolt 70C (first fastening device) to loosely be fitted into the first escape recess 212.

In the illustrated embodiment, as shown in FIG. 5, the first escape recess 212 defines a cylindrical interior space and internally houses the head portion 72C of the bolt 70C.

With the above configuration, the driven-side coupling member 2 is fastened to the intermediate member 6 in the bolt hole 211 (first coupling-side fastened portion) of the flange portion 21. Further, the driven-side coupling member 2 is configured such that the bolt 70C (first fastening device) can loosely be fitted into the first escape recess 212 formed on the end surface 213 of the flange portion 21 on the side of the intermediate member 6. Providing the first escape recess 212, it is possible to reduce an interval between the intermediate member 6 and the flange portion 21. Reducing the interval between the intermediate member 6 and the flange portion 21, it is possible to decrease the total length of the coupling device 1, and to improve responsiveness of the intermediate member 6, to which the rotational force is transmitted from the driven-side coupling member 2, to the driven-side coupling member 2.

In some embodiments, the above-described base member 4 includes the above-described flange portion 40 (second flange portion) extending along the direction intersecting with (orthogonal to) the axis LA. As shown in FIG. 5, the above-described flange portion 40 includes the bolt hole 41 (second coupling-side fastened portion) configured to be fastened to the intermediate member 6 by the fastening device 7C. Further, as shown in FIG. 4, the above-described flange portion 40 includes a second escape recess 42 formed on an end surface 47 on the side of the intermediate member 6 and configured to allow the bolt 70B (third fastening device) to loosely be fitted into the second escape recess 42.

In the illustrated embodiment, as shown in FIG. 4, the second escape recess 42 defines a cylindrical interior space and internally houses the head portion 72B of the bolt 70B. Further, the second escape recess 42 communicates with a hole 43 for inserting a bolt fastening jig that penetrates toward the end surface 45.

With the above configuration, the base member 4 is fastened to the intermediate member 6 in the bolt hole 41 (second coupling-side fastened portion) of the flange portion 40. Further, the base member 4 is configured such that the bolt 70B (third fastening device) can loosely be fitted into the second escape recess 42 formed on the end surface 47 of the flange portion 40 on the side of the intermediate member 6. Providing the second escape recess 42, it is possible to reduce an interval between the intermediate member 6 and the flange portion 40. Reducing the interval between the intermediate member 6 and the flange portion 40, it is possible to decrease the total length of the coupling device 1, and to improve responsiveness of the base member 4 (driving-side coupling member 3), to which the rotational force is transmitted from the intermediate member 6, to the intermediate member 6.

In some embodiments, the above-described intermediate member 6 is configured to be fixed to the driven-side coupling member 2 and the base member 4 with the gap in the X-axis direction. In other words, the coupling device 1 provides a spacer 8 between the intermediate member 6 and the driven-side coupling member 2 in the X-axis direction, and provides the spacer 8 between the intermediate member 6 and the base member 4 in the X-axis direction.

With the above configuration, the intermediate member 6 is fixed to the driven-side coupling member 2 and the base member 4 with the gap in the extension direction of the axis LA. Thus, the intermediate member 6 is not constrained by the driven-side coupling member 2 and the base member 4, making it possible to rapidly absorb misalignment between the axial centers of the first shaft 11 and the second shaft 13 caused when the rotational force is transmitted.

As described above, in some embodiments, as shown in FIG. 1, one of the above-described first shaft 11 and the above-described second shaft 13 includes the driving shaft 13A of the pump driving unit 14 (diesel engine 10). The other of the above-described first shaft 11 and the above-described second shaft 13 includes the driven shaft 11A of the fuel injection pump 12 configured to pump the liquid fuel to the combustion chamber 103 (diesel engine 10). In this case, it is possible to easily perform work to adjust the rotational phase between the driving shaft 13A of the pump driving unit 14 (diesel engine 10) and the driven shaft 11A of the fuel injection pump 12.

As described above, in some embodiments, as shown in FIG. 6, the at least one plate spring member 60A includes a first fastened portion 63 configured to be fastened to the above-described driven-side coupling member 2, and a second fastened portion 64 configured to be fastened to the above-described base member 4.

In the illustrated embodiment, the first fastened portion 63 includes the driven-side bolt insertion hole 61, and the second fastened portion 64 includes the driving-side bolt insertion hole 62.

With the above configuration, the plate spring member 60A is fastened to the driven-side coupling member 2 in the first fastened portion 63, and is fastened to the base member 4 in the second fastened portion 64. That is, the coupling device 1 that includes the plate spring member 60A including the first fastened portion 63 and the second fastened portion 64 is a so-called single disk type coupling. Such coupling device 1 can have a decreased total length in the extension direction of the axis LA, and thus can be installed even in a narrow gap between the first shaft 11 and the second shaft 13.

Figure 7:
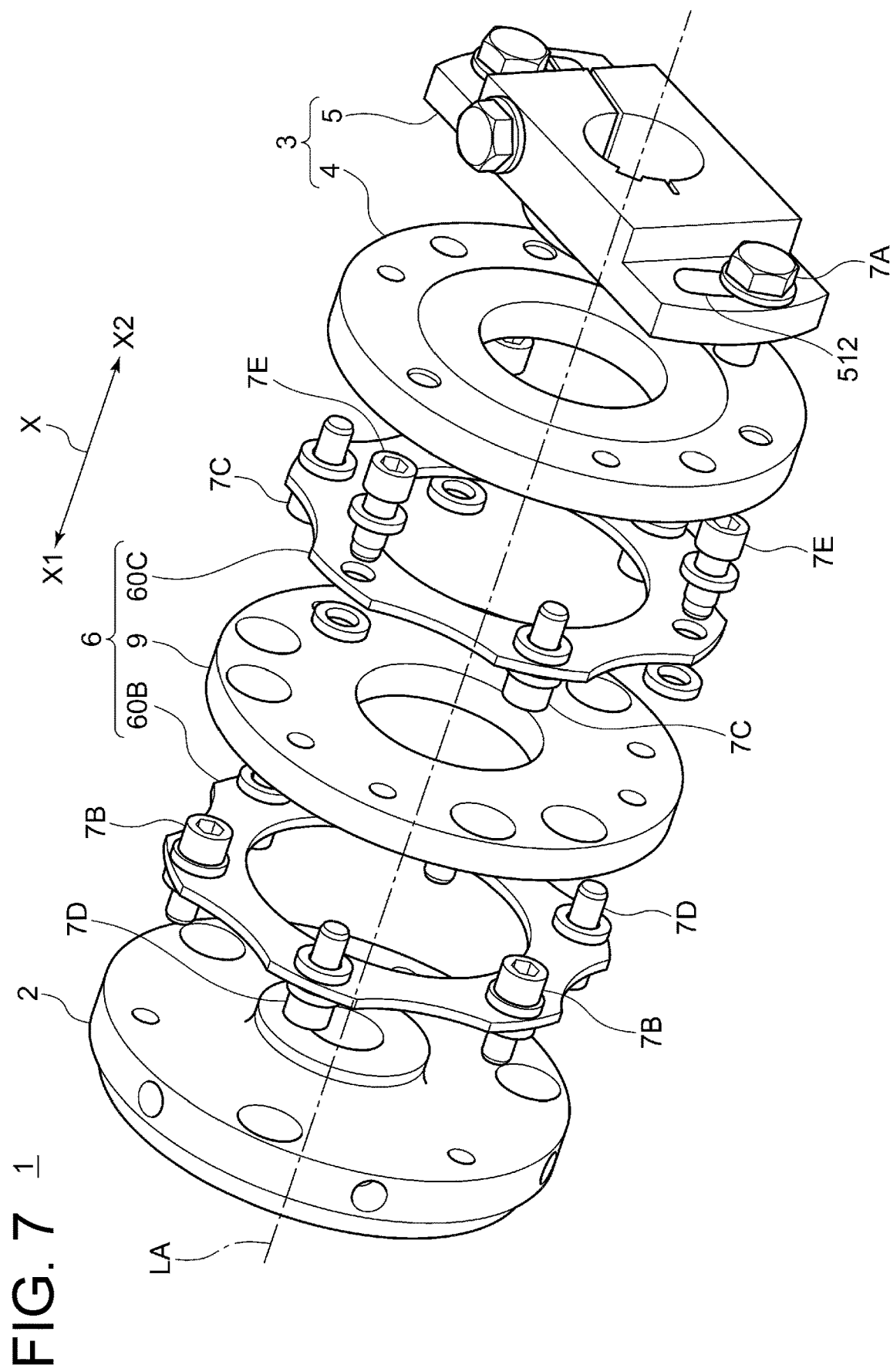
FIG. 7 is a schematic exploded perspective view of the coupling device according to another embodiment of the present invention.

FIG. 7 is a schematic exploded perspective view of the coupling device according to another embodiment of the present invention.

In some embodiments, as shown in FIG. 7, the intermediate member 6 includes, in order from the X1 side, a first plate spring member 60B configured to be fixed to the driven-side coupling member 2 via the fastening device 7B, a connecting member 9 configured to be fixed to the first plate spring member 60B via the fastening device 7D, and a second plate spring member 60C configured to be fixed to the connecting member 9 via the fastening device 7E, as well as configured to be fixed to the base member 4 via the fastening device 7C. That is, the coupling device 1 shown in FIG. 7 is a so-called double disk type coupling. The fastening device 7D and the fastening device 7E have the same configuration as the fastening devices 7B and 7C.

Figure 8:
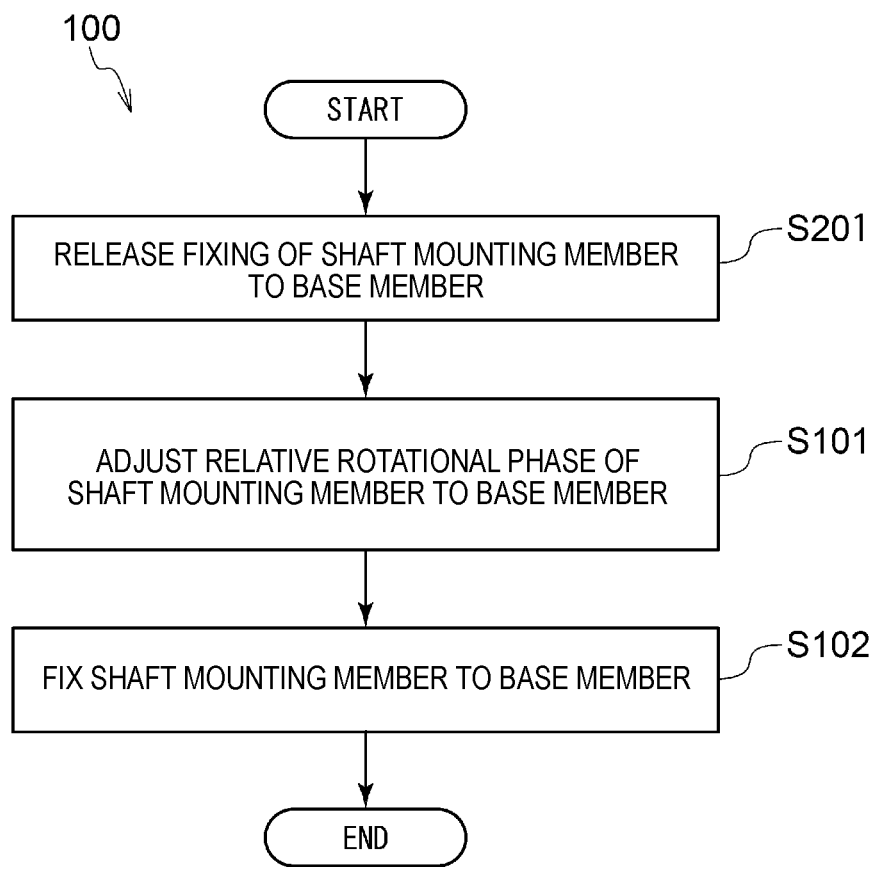
FIG. 8 is a flowchart showing an example of a rotational phase adjustment method for the coupling device according to an embodiment of the present invention.

FIG. 8 is a flowchart showing an example of a rotational phase adjustment method for the coupling device according to an embodiment of the present invention.

A rotational phase adjustment method 100 for the coupling device according to some embodiments is a method for adjusting the relative rotational phase of the shaft mounting member 5 to the base member 4 in the coupling device 1 described above. As shown in FIG. 8, the rotational phase adjustment method 100 for the coupling device includes a relative rotation step S101 of relatively rotating the shaft mounting member 5 to the base member 4, and a fixing step S102 of fixing the shaft mounting member 5 to the base member 4 by the fastening device 7A after the relative rotation step S101.

In the illustrated embodiment, as shown in FIG. 8, the rotational phase adjustment method 100 further includes a fixing release step S201 of releasing fixing of the shaft mounting member 5 to the base member 4 by the fastening device 7A, before the relative rotation step S101. The fixing release step S201 includes loosening the bolt 70A of the fastening device 7A for fixing the shaft mounting member 5 to the base member 4, before the fixing release step S201. By loosening the bolt 70A, the shaft mounting member 5 can be relatively rotatable to the base member 4.

With the above method, the rotational phase adjustment method 100 for the coupling device includes the relative rotation step S101 of relatively rotating the shaft mounting member 5 to the base member 4, and the fixing step S102 of fixing the shaft mounting member 5 to the base member 4 by the fastening device 7A after the relative rotation step S101. The rotational phase adjustment method 100 for the coupling device relatively rotates the shaft mounting member 5 to the base member 4 so as to shift the position where the shaft portion 71A of the bolt 70A (fastening device 7A) is inserted through the long hole 512 in the relative rotation step S101, and then fixes the shaft mounting member 5 to the base member 4 by the fastening device 7A in the fixing step S102. Such rotational phase adjustment method 100 for the coupling device can easily adjust the relative rotational phase of the shaft mounting member 5 to the base member 4, and can easily adjust the relative rotational phase of the second shaft 13 to the first shaft 11.

Further, with the above method, the intermediate member 6 is fixed to not the shaft mounting member 5 having the long hole 512, but the base member 4. Thus, even if the intermediate member 6 is deformed when absorbing the above-described misalignment, and the restoring force of restoring to the original shape is generated, the above-described restoring force acts on the base member via the fastening device 7C. That is, it is possible to prevent the above-described restoring force from acting on the shaft mounting member 5 having the long hole 512, making it possible to prevent slippage of the shaft mounting member 5.

The present invention is not limited to the above-described embodiments, and also includes an embodiment obtained by modifying the above-described embodiments and an embodiment obtained by combining these embodiments as appropriate.

REFERENCE SIGNS LIST

1 Coupling device
2 Driven-side coupling member
21 Flange portion
22 Protruding portion
23 Shaft insertion hole
24 Keyway
3 Driving-side coupling member
4 Base member
5 Shaft mounting member
51 Flange portion
52 Hub
53 Shaft insertion hole
54 Keyway
55 Slot
56 First divided section
57 Second divided section
6 Intermediate member
60 Elastic member
60A Plate spring
7A to 7E Fastening device
8 Spacer
9 Connecting member
10 Diesel engine
11 First shaft
11A Driven shaft
12 Fuel injection pump
13 Second shaft
13A Driving shaft
14 Pump driving unit
15, 17 Key
16 Fastening member
18 Bolt
101 Cylinder
102 Piston
103 Combustion chamber
121 Cylinder
122 Plunger
123 Pumping chamber

The invention claimed is:
1. A coupling device comprising:
a first coupling member configured to relatively non-rotatably be mounted on a first shaft;
a second coupling member configured to relatively non-rotatably be mounted on a second shaft; and
an intermediate member disposed between the first coupling member and the second coupling member in an extension direction of an axis of the coupling device, the intermediate member being fixed to each of the first coupling member and the second coupling member, and being configured to allow misalignment between the first shaft and the second shaft,
wherein the second coupling member includes:
a base member configured to be fixed to the intermediate member by a first bolt; and
a shaft mounting member configured to relatively non-rotatably be mounted on the second shaft, the shaft mounting member having a slot extending along a circumferential direction of the axis and being config- ured to detachably be fixed to the base member by a second bolt inserted through the slot, wherein the first coupling member includes a first flange portion extending along a direction intersecting with the axis, and wherein the first flange portion includes a first coupling-side fastened portion configured to be fastened to the intermediate member by a third bolt, and a first escape recess formed on an end surface on a side of the intermediate member and configured to allow a head portion of the first bolt to be housed in the first escape recess.

2. The coupling device according to claim 1, wherein one member of the base member and the shaft mounting member includes a protruding shaft portion which protrudes from an end surface facing another end surface to be coaxial with the axis in the extension direction of the axis and is formed to have a circular cross-section orthogonal to the axis; and wherein the other member of the base member and the shaft mounting member includes a fitting hole portion which is disposed in the another end surface and is configured to be fitted with the protruding shaft portion, the other member having an inner circumferential surface formed to have a circular cross-section orthogonal to the axis.

3. The coupling device according to claim 2, wherein the end surface facing the another end surface of the one member includes a shaft portion-side end surface located on an outer circumferential side of the protruding shaft portion and extending along a direction intersecting with the axis, wherein the another end surface of the other member includes a hole portion-side end surface located on an outer circumferential side of the fitting hole portion and extending along the direction intersecting with the axis, and wherein the one member and the other member are configured such that the shaft portion-side end surface and the hole portion-side end surface are disposed in contact with each other.

4. The coupling device according to claim 1, wherein the intermediate member includes at least one plate spring member which extends along a direction intersecting with the axis and is configured to be flexible along the direction intersecting with the axis.

5. The coupling device according to claim 4, wherein the at least one plate spring member includes a first fastened portion configured to be fastened to the first coupling member, and a second fastened portion configured to be fastened to the base member.

6. The coupling device according to claim 1, wherein the base member includes a second flange portion extending along the direction intersecting with the axis, and wherein the second flange portion includes a second coupling-side fastened portion configured to be fastened to the intermediate member by the first bolt, and a second escape recess formed on the end surface on the side of the intermediate member and configured to allow a head portion of the third bolt to be housed in the second escape recess.

7. The coupling device according to claim 1, wherein the intermediate member is configured to be fixed to the first coupling member and the base member with a gap in the extension direction of the axis.

8. The coupling device according to claim 1, wherein one of the first shaft and the second shaft includes a driving shaft of a diesel engine, and wherein the other of the first shaft and the second shaft includes a driven shaft of a fuel injection pump configured to pump liquid fuel to the diesel engine.

9. A rotational phase adjustment method for a coupling device configured to transmit a rotational force between a first shaft and a second shaft, the coupling device including:

a first coupling member configured to relatively non-rotatably be mounted on the first shaft;

a second coupling member configured to relatively non-rotatably be mounted on the second shaft; and an intermediate member disposed between the first coupling member and the second coupling member in an extension direction of an axis of the coupling device, and configured to allow misalignment between the first shaft and the second shaft, the second coupling member including:

a base member configured to be fixed to the intermediate member by a first bolt; and a shaft mounting member configured to relatively non-rotatably be mounted on the second shaft, the shaft mounting member having a slot extending along a circumferential direction of the axis and being configured to detachably be fixed to the base member by a second bolt inserted through the slot, wherein the first coupling member includes a first flange portion extending along a direction intersecting with the axis, and wherein the first flange portion includes a first coupling-side fastened portion configured to be fastened to the intermediate member by a third bolt, and a first escape recess formed on an end surface on a side of the intermediate member and configured to allow a head portion of the first bolt to be housed in the first escape recess, the rotational phase adjustment method for the coupling device, comprising:

a relative rotation step of relatively rotating the shaft mounting member to the base member; and a fixing step of fixing the shaft mounting member to the base member by the second bolt, after the relative rotation step.

* * * * *